(12) United States Patent
Musale

(10) Patent No.: US 8,980,101 B2
(45) Date of Patent: Mar. 17, 2015

(54) METHOD FOR INHIBITING SCALE FORMATION AND DEPOSITION IN MEMBRANE SYSTEMS VIA THE USE OF AN AA-AMPS COPOLYMER

(75) Inventor: Deepak A. Musale, Aurora, IL (US)

(73) Assignee: Nalco Company, Naperville, IL (US)

( * ) Notice: Subject to any disclaimer, the term of this patent is extended or adjusted under 35 U.S.C. 154(b) by 541 days.

(21) Appl. No.: 12/204,488

(22) Filed: Sep. 4, 2008

(65) Prior Publication Data
US 2010/0051559 A1 Mar. 4, 2010

(51) Int. Cl.
| | |
|---|---|
| C02F 1/00 | (2006.01) |
| B03D 3/06 | (2006.01) |
| C02F 1/68 | (2006.01) |
| C02F 5/02 | (2006.01) |
| C02F 5/08 | (2006.01) |
| C02F 5/12 | (2006.01) |
| B01D 35/00 | (2006.01) |
| B01D 35/14 | (2006.01) |
| B01D 61/00 | (2006.01) |
| C02F 1/44 | (2006.01) |
| C02F 1/66 | (2006.01) |
| C02F 9/00 | (2006.01) |

(52) U.S. Cl.
CPC ... *C02F 5/12* (2013.01); *C02F 1/44* (2013.01); *C02F 1/66* (2013.01); *C02F 9/00* (2013.01)
USPC .......... 210/701; 210/696; 210/698; 210/749; 210/86; 210/96.2; 252/175

(58) Field of Classification Search
USPC ........................................................ 210/639
See application file for complete search history.

(56) References Cited

U.S. PATENT DOCUMENTS

| | | | | |
|---|---|---|---|---|
| 3,928,196 | A | * | 12/1975 | Persinski et al. ............... 210/701 |
| 4,634,532 | A | * | 1/1987 | Logan et al. .................. 210/697 |
| 4,640,793 | A | * | 2/1987 | Persinski et al. ............... 252/180 |
| 4,952,327 | A | * | 8/1990 | Amjad et al. .................. 210/701 |
| 4,973,409 | A | * | 11/1990 | Cook ............................ 210/699 |

(Continued)

FOREIGN PATENT DOCUMENTS

| | | |
|---|---|---|
| EP | 0451434 B1 | 10/1991 |
| JP | 11-267644 A | 10/1999 |

(Continued)

OTHER PUBLICATIONS

International Search Report for PCT/US2009/055964.

(Continued)

*Primary Examiner* — Nam Nguyen
*Assistant Examiner* — Clare Perrin
(74) *Attorney, Agent, or Firm* — Leydig, Voit & Mayer, Ltd.

(57) ABSTRACT

A method of inhibiting scale formation and deposition from a feed stream passing through a membrane system is disclosed. The method comprises: (a) controlling the pH of said feed stream within the range between about 7.0 and about 8.2; (b) optionally controlling the temperature of said feed stream within the range between about 5° C. to about 40° C. when the membrane system is an RO system, a NF system, an ED system, an EDI system or a combination thereof; (c) optionally controlling the temperature of said feed stream within the range between about 40° C. and about 80° C. when the membrane system is an MD system; and (d) adding an effective amount of a scale inhibitor to said feed stream, said scale inhibitor comprises an AA-AMPS copolymer.

6 Claims, 3 Drawing Sheets

(56) References Cited

U.S. PATENT DOCUMENTS

| | | | |
|---|---|---|---|
| 5,087,376 A | | 2/1992 | Bendiksen et al. |
| 5,128,045 A | * | 7/1992 | Parsons et al. ............... 210/699 |
| 5,244,579 A | * | 9/1993 | Horner et al. ............... 210/652 |
| 5,256,303 A | | 10/1993 | Zeiher et al. |
| 5,358,640 A | * | 10/1994 | Zeiher et al. ............... 210/639 |
| 5,562,830 A | * | 10/1996 | Zidovec et al. ............... 210/699 |
| 6,641,754 B2 | * | 11/2003 | Buentello et al. ............... 252/180 |
| 7,087,189 B2 | * | 8/2006 | Austin et al. ............... 252/180 |
| 2005/0023506 A1 | | 2/2005 | Someya et al. |
| 2005/0056589 A1 | * | 3/2005 | Hendel et al. ............... 210/639 |
| 2006/0124301 A1 | | 6/2006 | Gupta et al. |
| 2009/0101587 A1 | * | 4/2009 | Blokker et al. ............... 210/701 |
| 2009/0114247 A1 | | 5/2009 | Brown et al. |
| 2010/0051559 A1 | | 3/2010 | Musale |

FOREIGN PATENT DOCUMENTS

| | | |
|---|---|---|
| JP | 2001-129554 A | 5/2001 |
| JP | 2001-224933 A | 8/2001 |

OTHER PUBLICATIONS

KIPO, International Search Report in International Patent Application No. PCT/US2011/033533, 3 pp., Jan. 19, 2012.

KIPO, Written Opinion in International Patent Application No. PCT/US2011/033533, 3 pp., Jan. 19, 2012.

\* cited by examiner

METHOD FOR INHIBITING SCALE FORMATION AND DEPOSITION IN MEMBRANE SYSTEMS VIA THE USE OF AN AA-AMPS COPOLYMER

FIELD OF THE INVENTION

This invention pertains to a method of inhibiting scale formation and deposition in membrane systems.

BACKGROUND

Nanofiltration (NF), Reverse Osmosis (RO), Electrodialysis (ED), Electrodeionization (EDI) and Membrane Distillation (MD) membrane processes have been used for the treatment of brackish (ground and surface) water, seawater and treated wastewater. During the concentration process, the solubility limits of sparingly soluble salts such as sulfates of calcium, barium, magnesium and strontium; carbonates of calcium, magnesium, barium; and phosphates of calcium, are exceeded, resulting in scale formation on a membrane surface as well as in the system. Membrane scaling results in the loss of permeate flux through the membrane, increases in salt passage through the membrane (except in MD), and increases in pressure drop across membrane elements. All of these factors result in a higher operating cost of running the above-mentioned processes and a loss of water production through these membrane systems.

Antiscalants are successfully used either alone or in conjunction with a pH adjustment (in case of carbonate and phosphate scales) to inhibit scale formation. Most of the commercial antiscalants used e.g. in NF and RO processes are polyacrylates, organo-phosphonates, acrylamide copolymers and/or their blends. Due to increasingly stringent regulations on phosphorous-based materials, phosphorous-free antiscalants are required. Polyacrylate based antiscalants work only with some water chemistries and do not perform well in others, especially those containing iron. Therefore, there is a need for developing phosphorous free antiscalants for NF, RO, ED, EDI and MD processes.

SUMMARY OF INVENTION

The present invention provides for a method of inhibiting scale formation and deposition from a feed stream passing through a membrane system which comprises the steps of: (a) controlling the pH of said feed stream within the range between about 7.0 and about 8.2; (b) optionally controlling the temperature of said feed stream within the range between about 5° C. to about 40° C. when the membrane system is an RO system, a NF system, an ED system, an EDI system or a combination thereof; (c) optionally controlling the temperature of said feed stream within the range between about 40° C. and about 80° C. when the membrane system is an MD system; and (d) adding an effective amount of a scale inhibitor to said feed stream, said scale inhibitor comprises an AA-AMPS copolymer.

The present invention also provides for a method of inhibiting calcium carbonate scale formation and deposition from a feed stream passing through a membrane system which comprises the steps of: (a) controlling the pH of said feed stream within the range between about 7.0 and about 8.2; (b) optionally controlling the temperature of said feed stream within the range between about 5° C. to about 40° C. when the membrane system is an RO system, a NF system, an ED system, an EDI system or combination thereof; (c) optionally controlling the temperature of said feed stream within the range between about 40° C. and about 80° C. when the membrane system is an MD system; and (d) adding an effective amount of a scale inhibitor to said feed stream, wherein said scale inhibitor comprises an AA-AMPS copolymer.

DETAILED DESCRIPTION OF THE INVENTION

Definitions

Figure 1:
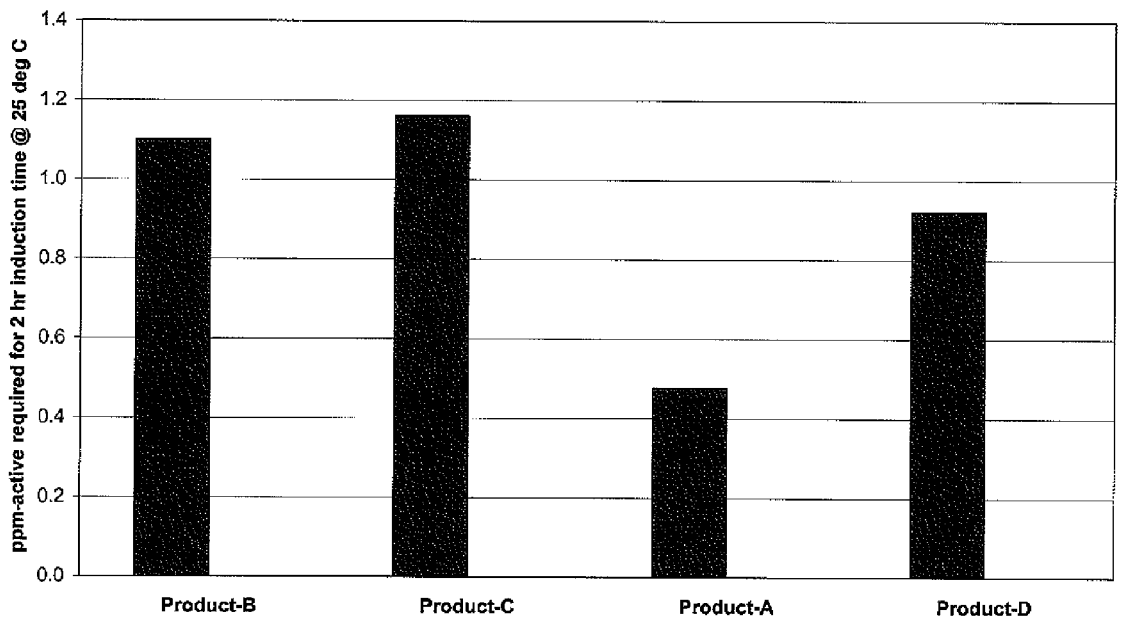
FIG. 1 shows scale inhibition in jar testing with Product A, Product B, Product C, and Product D.

A "membrane system" refers to a membrane system that contains an RO system and/or NF system and/or ED system and/or MD system and/or EDI system or a combination thereof. There are various components of a membrane system that would be appreciated by one of ordinary skill in the art, e.g. a specific type or combination of membranes; a feed stream; a concentrate stream; a permeate stream; one or more apparatuses for facilitating the transfer of a stream; a combination thereof, as well as other system components that would be appreciated by one of ordinary skill in the art. The target stream that is being separated/filtered could come from various sources and one of ordinary skill in the art would be able to appreciate whether a particular membrane system can achieve the desired separation/filtration of a target stream in to its components.

AA: Acrylic acid

AMPS: 2-acrylamido, 2-methyl propyl sulfonic acid

RO: reverse osmosis.

RO system: a membrane system that contains at least one reverse osmosis membrane;

NF: nanofiltration

NF system: a membrane system that contains at least one nanofiltration membrane.

ED: electrodialysis or electrodialysis reversal.

ED system: a membrane system that contains at least one apparatus capable of performing electrodialysis or electrodialysis reversal.

MD: membrane distillation.

MD system: a membrane system that contains at least one apparatus capable of performing membrane distillation.

EDI: electrodeionization.

EDI system: a membrane system that contains at least one apparatus capable of performing electrodeionization.

Preferred Embodiments

As stated above, the present invention provides for a method of inhibiting scale formation and deposition from a feed stream passing through a membrane system. In one embodiment, the scale is made up of calcium carbonate. In a further embodiment, the scale excludes calcium sulfate, calcium phosphate, calcium fluoride and/or barium sulfate.

In another embodiment, the scale inhibitor excludes one or more phosphorous compounds.

In another embodiment, the scale inhibitor excludes a terpolymer.

In another embodiment, the scale inhibitor has a molar ratio between AA and the AMPS comonomers of 2:98 to 98:2.

In another embodiment, the comonomers of AA and AMPS may be in acid form or salt form.

In another embodiment, the counter ion for AA and AMPS salt is $Na^+$, $K^+$ or $NH^{4+}$ ion.

In another embodiment, the copolymer has a weight average molecular weight of about 1,000 to about 100,000 daltons.

Various amounts of scale inhibitor chemistry can be added to moderate/minimize scale formation and/or deposition. One of ordinary skill in the art would be able to attenuate the amount of scale inhibitor based upon the type of membrane system, including but not limited to pre-analysis of the feed stream and identification of the type of scale. Other factors, which would be appreciated by one ordinary skill in the art can be considered in deciding how much chemistry should be added to a particular membrane system and said determination can be done without undue experimentation. In one embodiment, the effective amount of scale inhibitor is from about 0.01 ppm to about 30 ppm based upon polymer actives.

In another embodiment, the effective amount of scale inhibitor is determined based upon the hardness of the feed stream and/or reject stream from said membrane system.

In another embodiment, the effective amount of scale inhibitor is determined based on Langelier Saturation Index (LSI) of the feed stream and/or reject stream from said membrane system. LSI analysis is well known in the art of scale inhibition and membrane systems.

In another embodiment, the effective amount of scale inhibitor is determined by turbidity measurements of a water sample from the feed/reject collected from the membrane system.

The content of the feed stream and the type of feed stream can be of various types.

In another embodiment, iron [$Fe^{3+}$] is present in said feed stream.

In another embodiment, the feed stream may be raw water from a lake, a river, a well, wastewater, industrial process water, or seawater.

The following examples are not meant to be limiting.

EXAMPLES

The efficacy of an acrylic acid-AMPS (AA-AMPS) copolymer for calcium carbonate scale inhibition was determined by two methods: 1) inhibition of calcium carbonate precipitation in a jar-monitored by turbidity; and 2) inhibition of loss in flux in a spiral-wound RO membrane. All product dosages mentioned in following examples are based on active polymer solids.

| Water Chemistry* Used in Jar Testing | | | |
|---|---|---|---|
| Cation | ppm | Anion | ppm |
| $Na^+$ | 5883 | $Cl^-$ | 5037 |
| $K^+$ | 129 | $F^-$ | 3 |
| $Ca^{2+}$ | 818 | $CO_3^{2-}$ | 6 |
| $Ba^{2+}$ | 0.5 | $HCO_3^-$ | 1769 |
| $Mg^{2+}$ | 632 | $NO_3^-$ | 43 |
| | | $SiO_2$ | 75 |
| $Fe^{3+}$ | 0.5-1 | | |
| pH | 8.1 | LSI | 2.54 |
| Temperature | 13 +/− 2 and 25 +/− 2° C. | | |

*Simulated based on an RO concentrate of brackish water from an RO plant.

| Water Chemistry** Used in RO Scaling Test | | | |
|---|---|---|---|
| Cation | ppm | Anion | ppm |
| $Na^+$ | 2496 | $Cl^-$ | 2179 |
| $K^+$ | 34.4 | $F^-$ | 1.5 |
| $Ca^{2+}$ | 425 | $CO_3^{2-}$ | 3.4 |
| $Ba^{2+}$ | 0.27 | $HCO_3^-$ | 891 |
| $Mg^{2+}$ | 330 | $NO_3^-$ | 22.3 |
| | | $SiO_2$ | 38.4 (as $SiO_2$) |
| pH | 8.0 | | |
| Temperature | 25 +/− 2° C. | | |

**Simulated based on 2.5X RO feed concentration of brackish water from an RO plant.

I. Scale Inhibition in Jar Testing a) Without Iron @ 25° C.

In jar testing, induction time [defined as time elapsed after which the solution turbidity rises to 2 NTU (Nephelometric Turbidity Units) and above] was monitored for different non-phosphorous antiscalant formulations. FIG. 1 below shows that Product A (AA-AMPS Copolymer, 80:20 molar ratio of AA:AMPS, m.w. 20,000 Da) exhibited a desired 2 hr induction period with only 0.47 ppm of Product A, whereas other acrylamide-acrylic acid copolymer based products (Products B, C and D) needed a higher dosage to achieve the same induction period.

b) Product A Efficacy In Presence of Iron @ 25° C.

Figure 2:
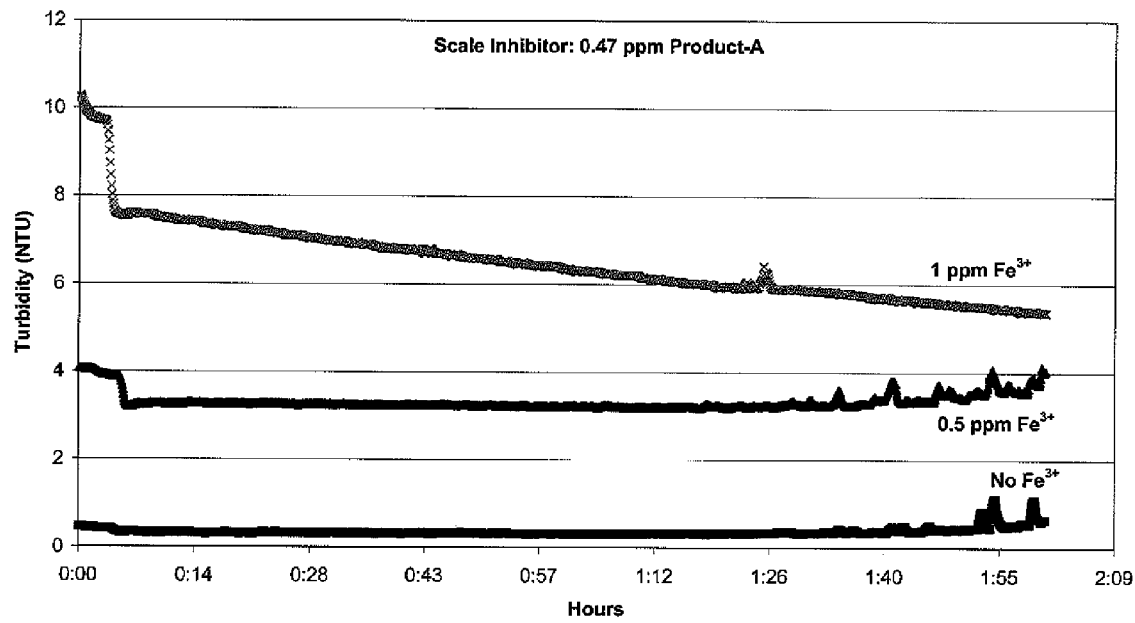
FIG. 2 shows Product A efficacy in the presence of iron in jar testing. Product A was tested in the presence of 1 ppm $Fe^{3+}$, 0.5 ppm $Fe^{3+}$, and no $Fe^{3+}$.

As shown in FIG. 2, Product A controlled the calcium carbonate crystal formation in the presence of both 0.5 ppm and 1 ppm $Fe^{3+}$, as indicated by stable turbidity for 2 hrs. In the presence of $Fe^{3+}$, initial turbidity was high due to $Fe^{3+}$ particles, but the objective of the test was to look for any further increase in turbidity with time due to calcium carbonate formation.

(c) Product A Efficacy at 12° C. and 25° C.

Figure 3:
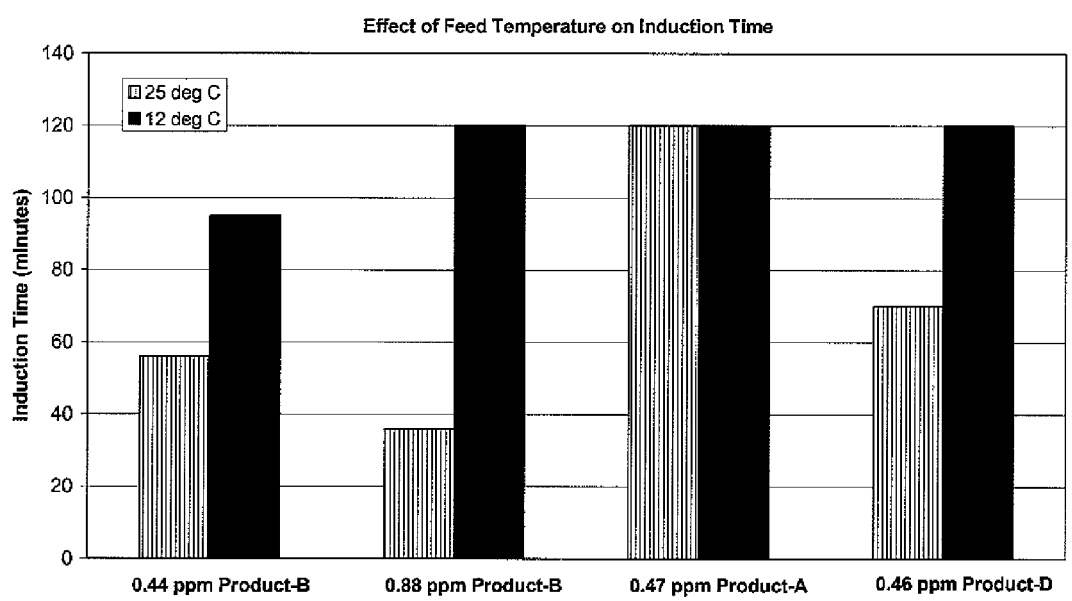
FIG. 3 shows Product A efficacy at two different temperatures (no iron) in the jar testing. Product A was tested at 12° C. and 25° C.

As shown in FIG. 3, 0.47 ppm Product-A allowed a 2 hr induction period at both a lower temperature of 12° C. and at an ambient temperature of 25° C., whereas 0.88 ppm of Product B was required at 12° C. and for product D, although the same dosage as product A worked at 12° C., the induction period at 25° C. for Product D was only 70 minutes.

II. Scale Inhibition in an RO Membrane System

Figure 4:
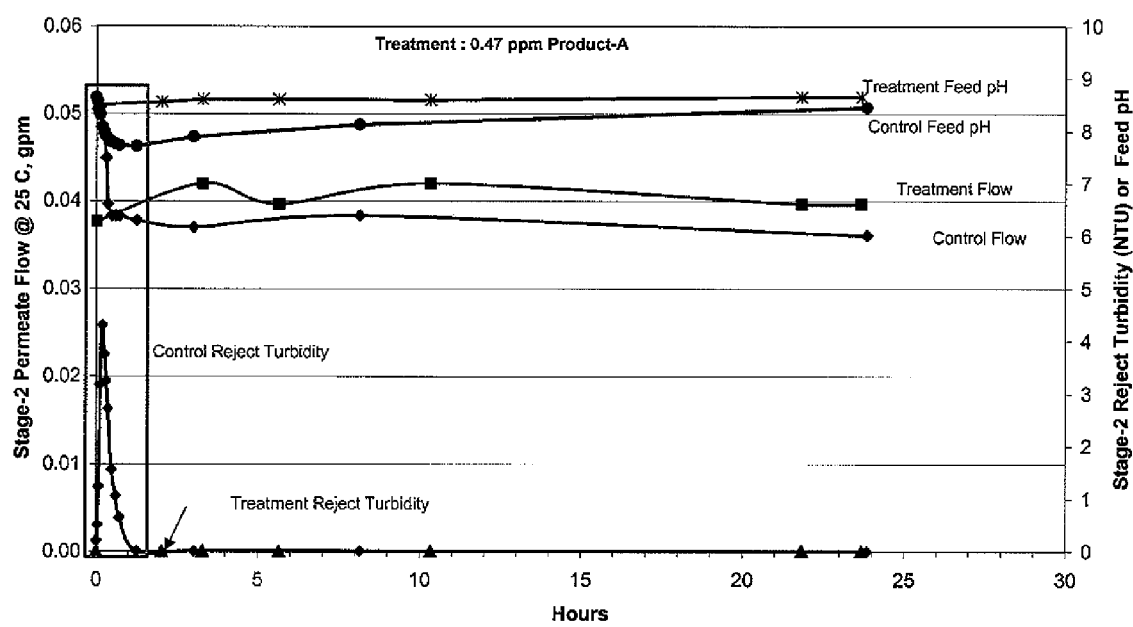
FIG. 4 shows RO scaling mitigation with Product A.

A two stage RO system with three 2.5"×21" elements in series in each stage (i.e. total 6 elements) was used to determine the efficacy of Product A for calcium carbonate scale inhibition. The concentrate of the first stage was connected as a feed to the second stage. Both the final concentrate and permeates from both stages were recycled back to the feed tank. The permeate flow, feed pH and reject turbidity (FIG. 4) and conductivity rejection (FIG. 5) results for the second stage, where most of the scaling is likely to occur, are shown below.

Figure 5:
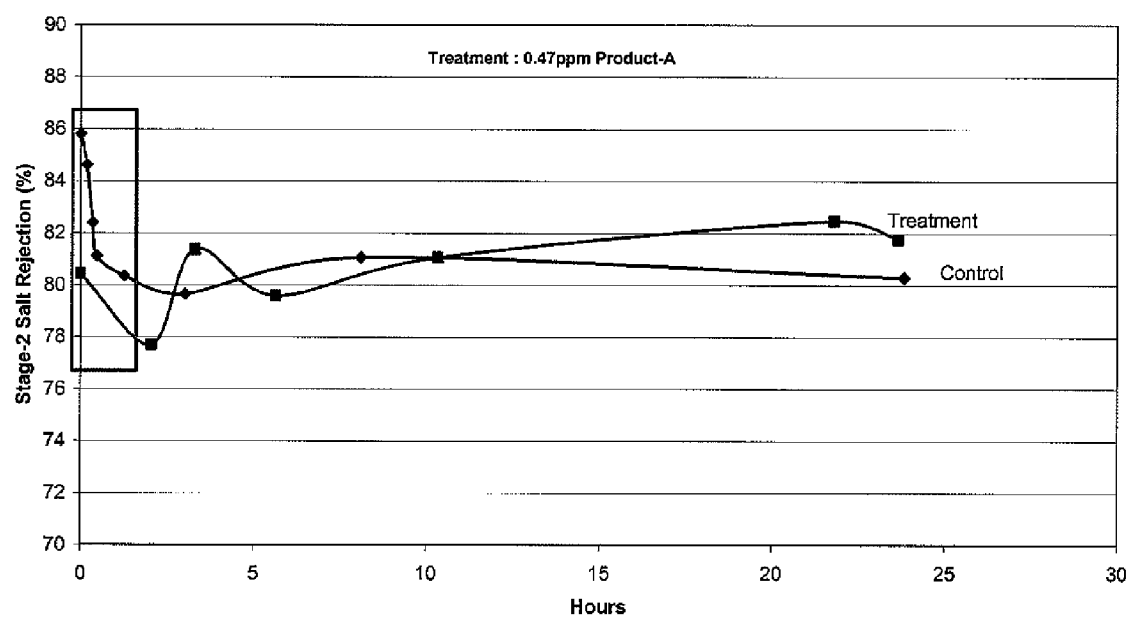
FIG. 5 shows RO scaling mitigation with Product A.

As shown above in FIG. 4, in the case of the control, the flux declined, the pH decreased and the concentrate turbidity increased within the first hour of operation, which indicated calcium carbonate scale deposition on a membrane surface, whereas with 0.47 ppm Product A the permeate flow, pH and turbidity were stable. Similarly, as shown in FIG. 5, conductivity rejection decreased within the first hour in the control, but the decline was very little with the treatment. This result indicated that scaling assisted concentration polarization in the control, which had resulted in higher salt passage (or lower rejection), was mitigated by Product A. Stable permeate flow and salt rejection for 24 hrs in the case of the treatment also indicated that 0.47 ppm Product-A did not foul the membrane. The non-phosphorous antiscalant should be membrane compatible.

I claim:

1. A method of inhibiting scale formation and deposition from an iron-containing [$Fe^{3+}$] feed stream passing through a reverse osmosis system, the method consisting essentially of:
   controlling the pH of said feed stream within the range between about 7.5 and about 8.2;
   controlling the temperature of said feed stream within the range between about 5° C. to about 40° C.; and
   adding an effective amount of a scale inhibitor to said feed stream, said scale inhibitor consisting of an acrylic acid—2-acrylamido, 2-methyl propyl sulfonic acid copolymer having a weight average molecular weight of about 1000 to about 100,000 daltons and a molar ratio of acrylic acid to 2-acrylamido, 2-methyl propyl sulfonic acid of 80:20;
   wherein the reverse osmosis system has a first stage and a second stage, wherein a concentrate stream from the first stage feeds the second stage; and
   wherein the effective amount of scale inhibitor is determined based upon stable turbidity measurements of said feed stream and/or a reject stream of the reverse osmosis system.

2. The method of claim 1, wherein said copolymer has a weight average molecular weight of about 20,000 daltons.

3. The method of claim 1, wherein said effective amount of scale inhibitor is from about 0.01 ppm to about 30 ppm based upon polymer actives.

4. The method of claim 1, wherein said feed stream is raw water from a lake, a river, a well, wastewater, industrial process water, sea water, or a combination thereof.

5. The method of claim 1, wherein the acrylic acid and the 2-acrylamido, 2-methyl propyl sulfonic acid comonomers are in acid form or salt form in said copolymer.

6. A method of stabilizing turbidity for at least two hours in an iron-containing [$Fe^{3+}$] feed stream passing through a reverse osmosis system, the method consisting essentially of:
   controlling the pH of said feed stream within the range between about 7.5 and about 8.2;
   controlling the temperature of said feed stream within the range between about 5° C. to about 40° C.; and
   adding an effective amount of a scale inhibitor to said feed stream, said scale inhibitor consisting of an acrylic acid—2-acrylamido, 2-methyl propyl sulfonic acid copolymer having a weight average molecular weight of about 20,000 daltons and a molar ratio of acrylic acid to 2-acrylamido, 2-methyl propyl sulfonic acid of 80:20;
   wherein the reverse osmosis system has a first stage and a second stage, wherein a concentrate stream from the first stage feeds the second stage; and
   wherein the effective amount of scale inhibitor is determined based upon stable turbidity measurements of a second stage reject stream from the reverse osmosis system for a period of time of two hours.

* * * * *